Nov. 23, 1926.
J. E. DUNGAN
1,607,880
SHREDDING MACHINE
Filed Feb. 23, 1923
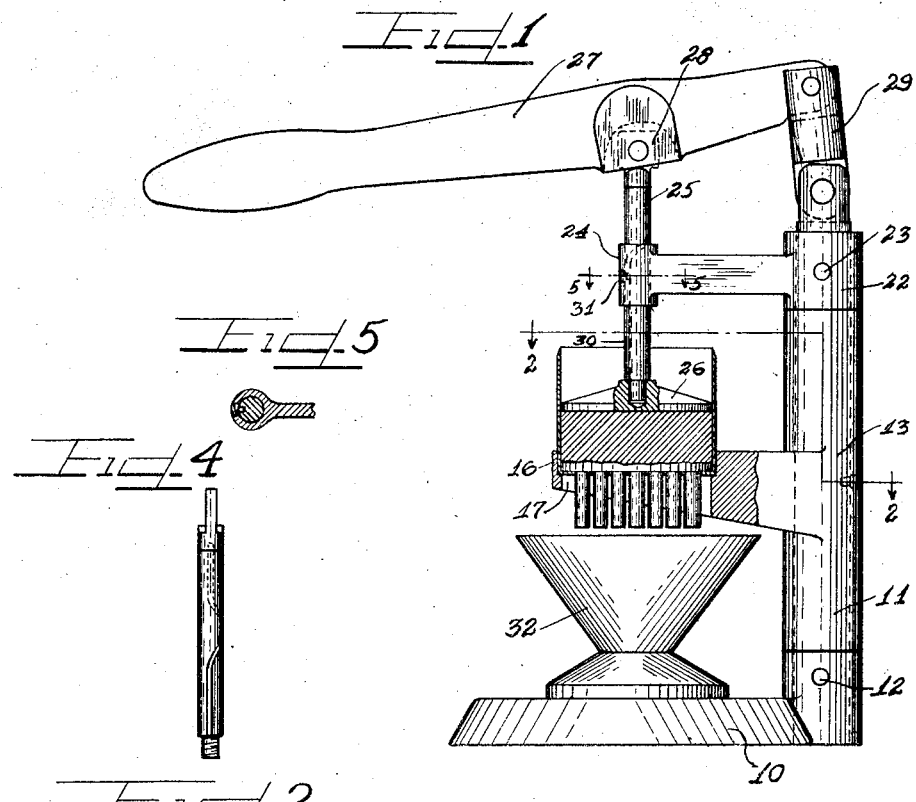
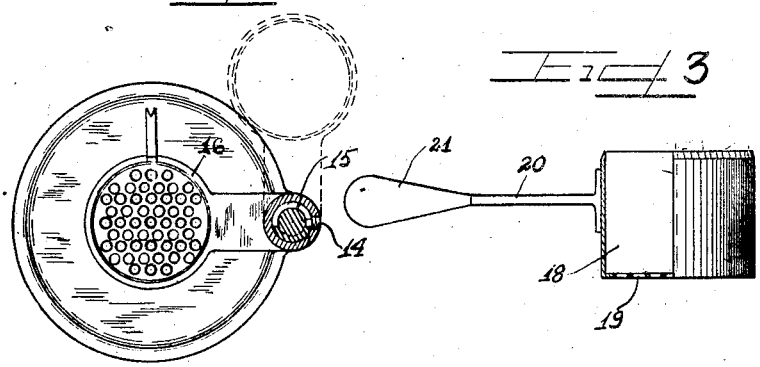
Inventor
John E. Dungan.

Patented Nov. 23, 1926.

1,607,880

UNITED STATES PATENT OFFICE.

JOHN E. DUNGAN, OF MOUNDSVILLE, WEST VIRGINIA.

SHREDDING MACHINE.

Application filed February 23, 1923. Serial No. 620,847.

My invention relates to shredding machines, and particularly to a device adapted to produce strings or shreds of plastic material such as ice cream or the like.

The objects of my invention are to provide portable means for shredding or "noodlizing" a quantity of ice cream or the like, to furnish suitable means for converting successive portions of semi-solid material of no particular conformation into a plurality of strings or "noodles" of uniform diameter, to allow disintegration of bulk ice cream for facilitating its consumption, and to put before the consuming public shredded ice cream, a new palatable and easily eaten dessert. Additionally, my invention provides a machine capable of carrying out all of the objects hereinbefore recited, and a mechanism in which ice cream may be so manipulated under the most sanitary of conditions, without waste,—economically, and with great rapidity.

A further object of the invention is to provide means for serving ice cream in a manner permitting of its ready treatment with auxiliary flavoring materials, whereby to enhance its quality, as in a "sundae."

These and such other objects as may hereinafter appear are obtained by the novel construction, combination and arrangement of the parts of my device illustrated in the accompanying single sheet of drawing, hereby made a part of this specification, and in which:—

Figure 1 is a side view, partly in elevation and partly in section, of my complete device.

Figure 2 is a view on the line 2—2 of Figure 1 partly plan and partly in section.

Figure 3 is a side view, partly in section, and partly in elevation of the cup or dipper member of my device.

Figure 4 is a detail of plunger construction; and

Figure 5 is a horizontal section of the plunger supporting arm along line 5—5 of Figure 1.

Similar parts are designated by identical reference characters in the drawing and in the description which follows.

The purpose of the invention is to supply means whereby to disintegrate ice cream, and the like, and to permit of it being served in a plurality of elongated grouped cylinders of small diameter. I have devised a vertically operating machine adapted to receive a quantity of firm or semi-solid ice cream, which ice cream, when pressure is brought to bear thereupon, will be converted into a number of small solid cylinders closely clustered.

In its simplest form, my machine comprises a base 10, which may be round, and which is provided with a vertical standard 11, disposed at the rim of base 10. Standard 11 may be cast integrally with base 10 or if preferred, produced separately therefrom, and secured thereto by a pin 12, as shown, or in some other equally suitable manner. At a convenient distance above base 10, is a bracket 13 rotatively mounted upon standard 11, and adapted to swing freely thereon to the right and left in a horizontal plane within certain defined limits determined by a screw member 14, as disclosed in the full and dotted lines of Figure 2. Said screw member 14 is secured to bracket 13, and its shank moves within a horizontal track or groove 15, cut in standard 11. Any means, such as a collar, may be employed to prevent vertical movement of bracket 13, upon standard 11 after assembly of the machine has been had. The track or groove 15 cut in standard 11 and in which the innermost end or shank of screw member 14 moves permits of bracket 13 being swung directly over the center of base 10 on the one hand as shown in full lines in Figure 2, and outwardly away from such center, about 90 degrees, on the other hand, as indicated by the dotted lines of the same figure.

The free end of bracket 13 comprises a shallow cylinder or circular frame 16 having constricted lower portion 17, such constricted lower portion 17, providing an internal annular shoulder upon which a cup 18 may be seated.

Cup 18 comprises a cylindrical shell having a sieve like or perforate bottom 19 as shown in Figures 2 and 3. At its upper and open end the material of the cup may be thinned or sharpened providing a cutting edge to facilitate the scooping up of a portion or quantity of ice cream therein. A handle 20 comprising a metallic shank projecting radially from the body of cup 18 and covered with a wooden grip portion 21, as is illustrated in Figure 3, may be secured to said cup in order to render the scooping operations of cup 18 not unlike that of the ordinary ice cream scoop. Cup 18 is of such diameter that it may be freely rotated within the frame 16 of bracket 13, but its movement downwardly therethrough is arrested by the internal shoulder at the constricted portion 17, which shoulder forms a firm seat for the cup 18 during the expressing action later to be described.

Disposed above the top of cup 18 is a stationary bracket 22, rigidly secured to standard 11, by a pin 23 or other suitable means. The innermost portion of such bracket 22 comprises a vertical bearing 24, centered upon base 10 and cup 18 when the latter is disposed within the bracket 18 and the latter swung inwardly to the extreme point of its travel. A plunger member comprising a shaft 25 secured to a head having a flat horizontal face operates vertically through bearing 24. Said plunger head 26 is adapted to snugly fit against the walls of cup 18 so that any plastic material placed in said cup will be completely compressed by the downward movement of plunger 25 and expelled from cup 18 through its perforate bottom 19.

In order to impart the necessary reciprocal and vertical movement of plunger member 25, a handle 27 is secured thereto, and a universal joint or bearing 28 allowing rotative movement of plunger 25, is provided for between said members. Handle 27 is pivotally connected to a link 29 which link 29,—in turn, is connected to the uppermost extremity of standard 11.

With each downward movement of plunger 25, and as it approaches its lowermost position, it is desirable to cause slight rotation of plunger 25. A groove or track 30, best shown in Figures 1 and 4, is cut in shaft 25. In this groove a guide screw 31, disposed in bearing 24 operates as a cam. The rotative movement of plunger 25 need be but a fraction of a revolution, but is preferably sharply accelerated.

For the purpose of shredding ice cream, the usual procedure is to swing bracket 13 into the position shown in the dotted lines in Figure 2. The cup 18 is then lifted therefrom and is used to scoop up a predetermined quantity of ice cream from the cans in which such commodity is ordinarily stored in a retail establishment.

The cup 18 is then replaced in its seat in bracket 13 and the latter, swung into the position shown disclosed in the full lines of Figure 2. Preferably while still retaining the grip portion 21 of cup 18 in one hand, handle 27 is forced downwardly causing plunger 25 to move downwardly therewith. This drives plunger head 26 into compressing the ice cream contained in cup 18, forcing such material through the perforate bottom 19 in a series of strings or shreds. As the plunger head 26 approaches the cup bottom 19, a rotary movement, as hereinbefore indicated, is imparted thereto whereby to cut off the shreds and to more forcibly eject or discharge the ice cream from the cup 18. Groove or track 30 and guide screw 31 may be dispensed with if desired, and the same "cutting off" action may be obtained by having the operator of the machine sharply rotate the cup 18 by an arcuate movement of handle 20, as the plunger 25 approaches the limit of its downmost movement.

A cup 32 to receive the discharged shredded ice cream is showed in conjunction with the machine. Any other suitable receptacle may be employed, but a "sundae" cup is particularly desirable for serving the disintegrated ice cream.

The device, as illustrated, is highly sanitary. Cup 18 and plunger head 26 alone come in contact with the ice cream to be treated. Plunger head 26 with its flat face and conical upper portion is readily cleansed while the shell cup 18 with its perforate bottom 19 is as readily cleansed and in precisely the same manner as the ordinary ice cream scoop.

When desired, the handle 20 may be omitted from cup 18, and the operator of the machine may place a quantity of ice cream withdrawn from the ice cream storage container by the usual scoop method in said cup while bracket 13 is swung out of alinement with plunger 25.

I claim:

1. A machine for shredding ice cream, comprising a frame, a bracket secured to said frame, an ice cream scooping member having a perforate bottom removably supported in said bracket, a pivot member, and a plunger actuated by said pivot member, for forcing said ice cream through the perforations in the bottom of said scooping member.

2. The combination described in claim 1 and in which said bracket is horizontally movable to facilitate seating and unseating of said scoop member.

3. An ice cream shredding machine comprising a frame, a bracket horizontally movable thereon, a detachable member having a perforate bottom for scooping ice cream and adapted to be rotatably disposed upon said bracket, a plunger for pressing ice cream through the perforate bottom of said scoop, and means for rotating said plunger, said last mentioned means being constructed so as to accelerate such rotative movement as the bottom of said scooping member is approached.

4. In combination, a standard having a receptacle seat, a removable receptable having a perforate bottom and rotatable in said seat, a reciprocating plunger co-acting with said receptacle, and means for rotating said plunger and receptacle during reciprocal movement of the former.

5. A machine of the class described comprising a base, a standard, a swingable bracket and a stationary bracket carried by said standard, a handle linked to said standard, a plunger rotatably connected to said handle and adapted to reciprocate in said stationary bracket, means upon said bracket for rotating said plunger during its reciprocation, and a cup member adapted to be removably and rotatably disposed in said swingable bracket and having a handle whereby to permit of it being used as a scoop.

JOHN E. DUNGAN.